(12) United States Patent
Yano (10) Patent No.: US 7,358,994 B2
(45) Date of Patent: Apr. 15, 2008

(54) IMAGE PROCESSING APPARATUS, IMAGE PROCESSING METHOD, RECORDING MEDIUM THEREOF, AND PROGRAM THEREOF

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1055 days.

(21) Appl. No.: 10/619,438

(22) Filed: Jul. 16, 2003

(65) Prior Publication Data

US 2004/0021779 A1 Feb. 5, 2004

(30) Foreign Application Priority Data

Jul. 30, 2002 (JP) ............................. 2002-221779

(51) Int. Cl.
*H04N 5/202* (2006.01)
(52) U.S. Cl. ...................... 348/254; 348/655; 348/657; 348/671; 348/672; 348/673; 348/678; 382/118; 382/168; 382/169; 382/274
(58) Field of Classification Search ............. 348/223.1, 348/225.1, 657, 672, 673, 254, 255, 671, 348/678; 382/118, 168, 169, 274, 172; 702/182
See application file for complete search history.

(56) References Cited

U.S. PATENT DOCUMENTS

| 6,101,294 | A | * | 8/2000 | McCaffrey et al. | ......... 382/312 |
|---|---|---|---|---|---|
| 6,148,092 | A | * | 11/2000 | Qian | ........................... 382/118 |
| 6,917,707 | B1 | * | 7/2005 | Kubota | ........................ 382/176 |
| 6,970,199 | B2 | * | 11/2005 | Venturino et al. | ..... 348/333.02 |
| 7,187,788 | B2 | * | 3/2007 | Simon et al. | ................ 382/118 |
| 7,233,357 | B1 | * | 6/2007 | Ohkubo | .................. 348/333.04 |
| 2003/0223622 | A1 | * | 12/2003 | Simon et al. | ................ 382/118 |
| 2006/0204124 | A1 | * | 9/2006 | Aihara | ........................ 382/274 |

* cited by examiner

*Primary Examiner*—Yano Kotaro
*Assistant Examiner*—Chriss S Yoder, III
(74) *Attorney, Agent, or Firm*—Fitzpatrick, Cella, Harper & Scinto (57) ABSTRACT

In image processing apparatus and method for displaying and printing a person image photographed by a digital camera, it is possible to automatically correct image data and output the person image of an optimum characteristic. In this apparatus, an image obtaining processor obtains the image data from a recording medium, a face region extraction processor extracts a face region of a person from the obtained image data, an image feature amount calculator calculates an image feature amount of the extracted face region, a correction effect inference processor infers whether or not a correction effect can be obtained by correcting a characteristic of the image data, based on the calculated image feature amount, and an image correction processor corrects the characteristic of the image data based on the image feature amount and thus outputs post-correction image data when it is inferred that the correction effect can be obtained.

6 Claims, 4 Drawing Sheets

IMAGE INFORMATION DATABASE

- IMAGE FILE NAME
- IMAGE DATA
- PHOTOGRAPHING INFORMATION
  - PHOTOGRAPHING MODE, FOCAL DISTANCE, DIAPHRAGM VALUE, ...
- DATA FORMAT INFORMATION
- PHOTOGRAPHING DATE AND HOUR INFORMATION
- CORRECTION HISTORY INFORMATION
- POST-CORRECTION IMAGE DATA
  ..

IMAGE PROCESSING APPARATUS, IMAGE PROCESSING METHOD, RECORDING MEDIUM THEREOF, AND PROGRAM THEREOF

BACKGROUND OF THE INVENTION

1. Field of the Invention

The present invention relates to an image processing apparatus which corrects gradation and color reproduction characteristics of an image photographed (or shot) by a digital camera or the like, an image processing method which is applied to the image processing apparatus, a recording medium which stores a program to execute the image processing method, and the program itself.

2. Related Background Art

Conventionally, in a case where an image photographed (or shot) by a digital camera is input into, e.g., a PC (personal computer) and the input image is displayed on a display such as a CRT (cathode ray tube) or printed by a printer such as an inkjet printer as it is, there are some cases where an image of optimum characteristics (e.g., lightness, color reproducibility, etc.) cannot be output. In these cases, the image characteristics are improved by controlling an exposure process and improving a color process in the digital camera. For example, when a person is photographed against light, a face portion of the subject (i.e., the person in question) might become dark, and/or the color of the face of the person in question might become yellowish due to adjustment of entire white balance. Particularly, it is desired to improve these characteristics in regard to a person image. Moreover, it is desired to reproduce a characteristic that human beings feel desirable, in regard to gradation reproducibility and color reproducibility in a person's skin region.

Incidentally, as methods of performing image data correction to obtain desirable color reproducibility in regard to a specific subject, the following technical methods are disclosed. That is, Japanese Patent Application Laid-Open No. 2001-092956 discloses a first proposal for the method of converting each representative color into a color characteristic that human beings feel desirable. Besides, Japanese Patent Application Laid-Open No. 2001-238177 discloses a second proposal for the method of extracting a face region in image data photographed in a person mode and processing the extracted region so that a flesh color finishes beautifully.

However, in the above first proposal, it is necessary to designate a specific target region in the image so as to determine the representative value, whereby there is a problem that an operation is complicated. Besides, in the above second proposal, there is a problem that the image including the face region is complicatedly composed of an image that a process effect can be expected, an image that a process effect cannot be expected, and further an image that brings about a reverse effect (hereinafter called a side effect). Therefore, in regard to the image processing apparatus which displays and prints the person image photographed by the digital camera, a demand for a function to automatically correct the image data and thus output the person image of an optimum characteristic increases.

SUMMARY OF THE INVENTION

An object of the present invention is to be able to, by using an image processing apparatus which displays and prints a person image photographed (or shot) by a digital camera, automatically correct image data and thus output the person image of an optimum characteristic.

Another object of the present invention is to be able to, in case of automatically correcting the image data by using the image processing apparatus which displays and prints the person image photographed by the digital camera, eliminate a side effect due to the correction process in advance and thus output the person image of the optimum characteristic.

Other objects and features of the present invention will be apparent from the following description taken in conjunction with the accompanying drawings.

DETAILED DESCRIPTION OF THE PREFERRED EMBODIMENTS

Hereinafter, one embodiment of the present invention will be described with reference to the accompanying drawings.

In the present embodiment, an image processing system will be explained by way of example. Here, in the image processing system, image data photographed (or shot) by a digital camera and recorded on a recording medium is subjected to an image process based on an application program installed in an image processing apparatus such as a PC or the like, and an image based on the processed image data is displayed on a display apparatus or printed by a printer. Besides, an image correction process to image data photographed in a person mode (in this mode, a person is included in a subject) will be explained.

Incidentally, the person mode is one of plural photographing modes provided in the digital camera. In the person mode, optimum automatic control to photograph a person (i.e., automatic control of an exposure time, a white balance and the like) is performed. Besides, the plural photographing modes include, e.g., a landscape mode which is optimum to photograph a landscape. In the present embodiment, as an example of the image correction process to the image including the person (subject), the image processing apparatus performs a process to correct a face region of the person so that it becomes an image of appropriate lightness. However, the present invention is not limited to this.

Figure 1:
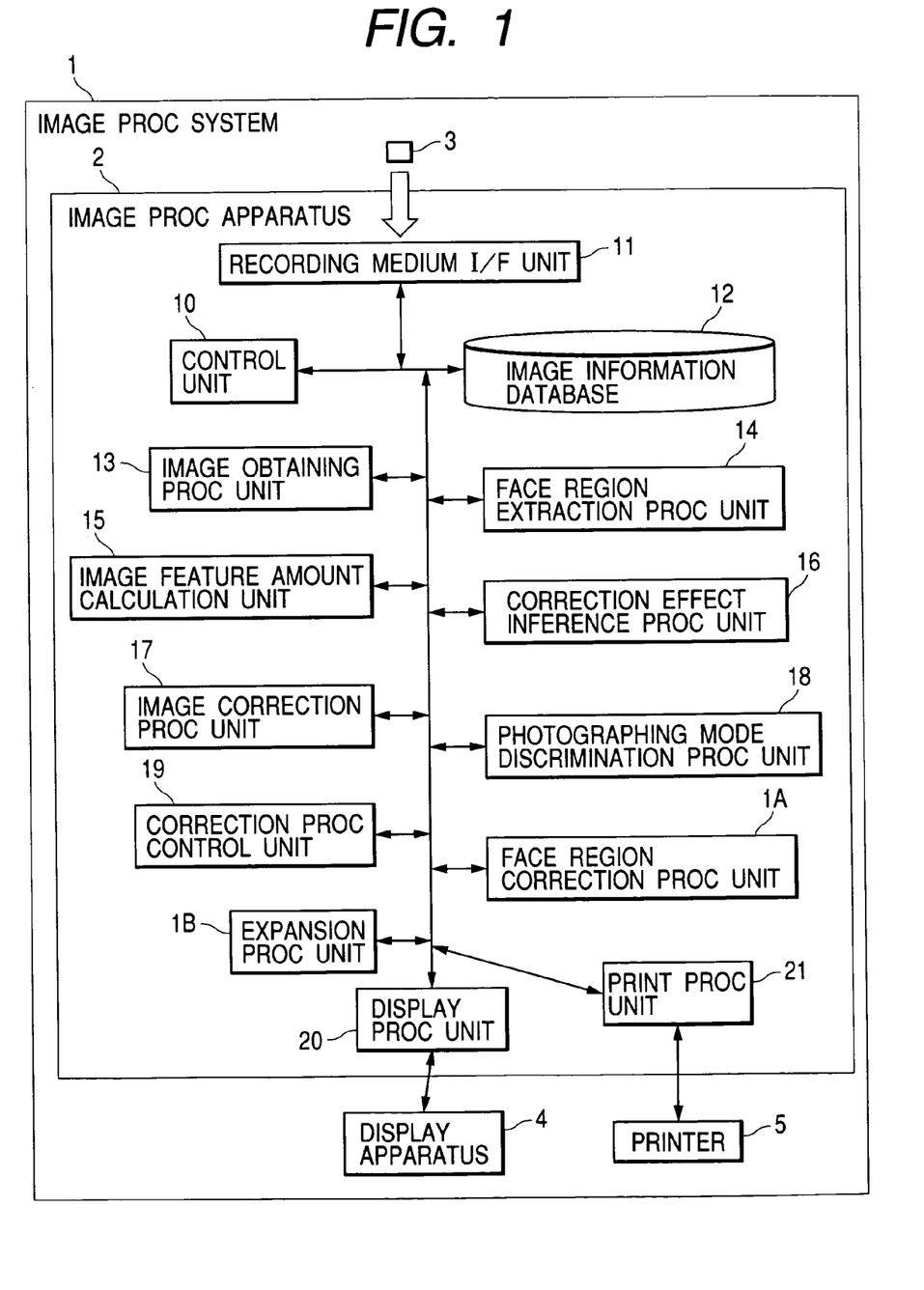
FIG. 1 is a block diagram showing the functional structure of an image processing apparatus according to one embodiment of the present invention and also showing the schematic structure of an image processing system which includes the image processing apparatus.

First of all, the functional structure of the image processing apparatus according to the present embodiment and the schematic structure of the image processing system which includes the image processing apparatus will be explained with reference to the attached drawings. FIG. 1 is a block diagram showing the functional structure of the image processing apparatus according to the present embodiment and also showing the schematic structure of the image processing system which includes the image processing apparatus. In FIG. 1, numeral 1 denotes an image processing system which includes an image processing apparatus 2, a display apparatus 4, and a printer 5. The image processing apparatus 2 reads image data from a recording medium 3 on which the image data photographed by a digital camera has been recorded, and performs an image process to the read image data, the display apparatus 4 displays an image obtained in the image process by the image processing apparatus 2, and the printer 5 prints the image obtained in the image process by the image processing apparatus 2.

Incidentally, the image data and the like are recorded on the recording medium 3 which is detachable in regard to the digital camera. Therefore, when an interface is provided between the image processing apparatus 2 and the recording medium 3, the image processing apparatus 2 can read the image data from the recording medium 3. The display apparatus 4 is, e.g., a CRT, an LCD (liquid crystal display) or the like. Although it is not shown in FIG. 1, the image processing apparatus 2 is equipped with an input apparatus including a keyboard, a mouse and the like.

Hereinafter, a series of processes beginning from the process that the digital camera records the image data on the recording medium 3 and ending to the process that the image processing system 1 outputs the image data to the display apparatus 4 or the printer 5 will be simply explained.

In the digital camera, the photographed image is recorded as the image data on the recording medium 3. As that time, as well as the image data, photographing information (or imaging information) is recorded as incidental information. For example, the photographing information includes focal distance information of a photographing lens, diaphragm value information of the photographing lens, exposure time information, exposure mode information, white balance mode information, flash ON/OFF information, photographing mode information, and the like. On the recording medium 3, the image data is ordinarily recorded as compression image data which has been compressed in a predetermined data format such as a JPEG (Joint Photographic Experts Group) format. Then, the image processing apparatus 2 expands the compression image data on the recording medium 3 according to a predetermined algorithm corresponding to the above compression method into image data of two-dimensional pixel arrangement composed of R (red), G (green) and B (blue) data. Subsequently, the image processing apparatus 2 displays the expanded image data on the display apparatus 4 and further prints it by the printer 5.

Then, the internal structure of the image processing apparatus 2 will be explained. Numeral 10 denotes a control unit which controls respective processing units and data flows in the image processing apparatus 2, and numeral 11 denotes a recording medium interface (I/F) unit by which data is read/written from/to the recording medium 3. Concretely, the recording medium I/F unit 11 reads the image data and the photographing information from the recording medium 3. Numeral 12 denotes an image information database in which the image data and the photographing information read from the recording medium 3 by the recording medium I/F unit 11 are correlated with "image file name" and stored.

Figure 2:
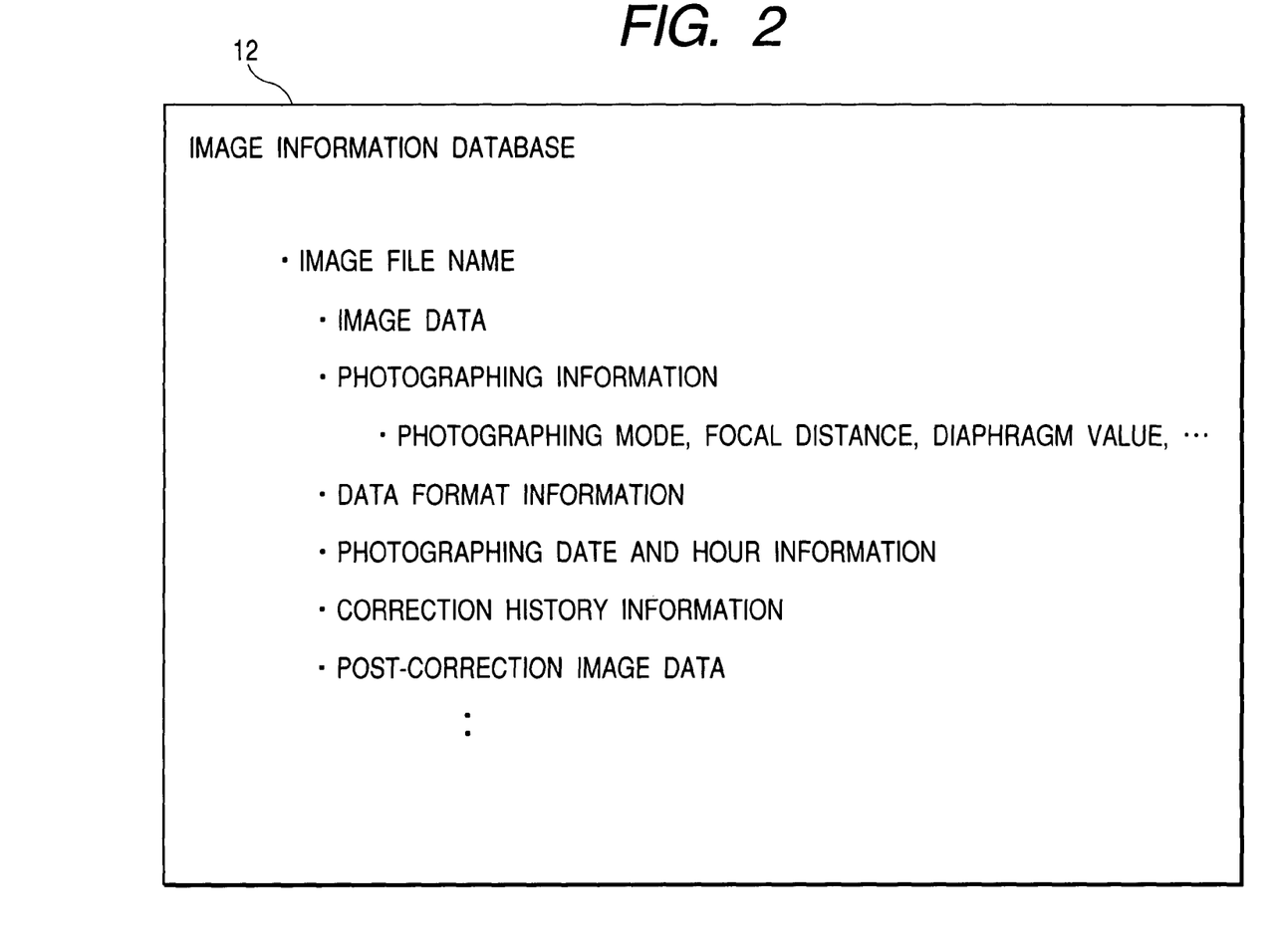
FIG. 2 is a diagram showing a construction example of image information to be stored in an image information database 12 shown in FIG. 1.

Here, a construction example of the image information stored in the image information database 12 will be explained. FIG. 2 is a diagram showing the construction example of the image information to be stored in the image information database 12 shown in FIG. 1. As shown in FIG. 2, various kinds of information are correlated with "image file name" which is an inherent file name of each image data and then stored in the image information database 12. More specifically, "image data" is the image data itself of JPEG format which is specified in "image file name", and "photographing information" is the information which concerns the state of the digital camera when the image data specified in "image file name" was photographed or shot. That is, "photographing information" includes photographing mode information, focal distance information of the photographing lens, diaphragm value information, exposure time information, exposure mode information, white balance mode information, flash ON/OFF information and the like.

Besides, "data format information" is the information concerning a data format (e.g., JPEG format) of the image data specified in "image file name", an image size, the number of pixels (or resolution), and the like. Moreover, "photographing date and hour information" is the information concerning date and time when the image data specified in "image file name" was photographed and obtained, "correction history information" is the information concerning a history of the correction which was performed by the image processing apparatus 2 to the image data specified in "image file name", and "post-correction image data" is the information concerning post-correction image data which was obtained by the correction of the image processing apparatus 2 to the image data specified in "image file name".

Then, the structure of the image processing apparatus 2 will be again explained. Numeral 13 denotes an image obtaining processing unit (image obtaining means) which obtains through the recording medium I/F unit 11 the image data and the above photographing information from the recording medium 3 on which the image data indicating the image including the person has been recorded. The image data and the photographing information obtained by the image obtaining processing unit 13 are correlated with "image file name" and stored in the image information database 12. Numeral 14 denotes a face region extraction processing unit which extracts the face region of the person from the image data obtained by the image obtaining processing unit 13. Here, it should be noted that the detailed process of the face region extraction processing unit 14 will be explained later.

Numeral 15 denotes an image feature amount calculation unit (image feature amount calculation means) which calculates an image feature amount of the face region extracted from the image data by the face region extraction processing unit 14. More specifically, the image feature amount calculation unit 15 calculates, as the image feature amount, a lightness distribution of the pixels in a flesh color region and an area of the face region, on the basis of the image data. Here, it should be noted that the image data processed by the image feature amount calculation unit 15 is not limited to the image data obtained by the image obtaining processing unit 13, that is, "image data" and "post-correction image data" stored in the image information database 12 may be used as the image data processed by the image feature amount calculation unit 15.

Numeral 16 denotes a correction effect inference processing unit (correction effect inference means) which infers whether or not a correction effect can be obtained by correcting characteristics (lightness, hue, etc.) of the image data, on the basis of the image feature amount calculated by the image feature amount calculation unit 15. Then, the correction effect inference processing unit 16 outputs an inference result (first inference result). More specifically, the correction effect inference processing unit 16 infers the effect of the correction in accordance with the size of the area of the face region calculated by the image feature amount calculation unit 15. That is, when the area of the face region is larger than a predetermined value, the correction effect inference processing unit 16 infers that the correction effect can be obtained.

Numeral 17 denotes an image correction processing unit. When it is inferred by the correction effect inference processing unit 16 that the correction effect can be obtained, the image correction processing unit 17 corrects the characteristic of the image data on the basis of the image feature amount, and then outputs the post-correction image data.

Numeral 18 denotes a photographing mode discrimination processing unit (photographing mode discrimination means) which discriminates whether or not the photographing mode included in the photographing information obtained by the image obtaining processing unit 13 is the person mode. Numeral 19 denotes a correction process control unit (correction process control means). When it is discriminated by the photographing mode discrimination processing unit 18 that the photographing mode included in the photographing information is the person mode, the correction process control unit 19 performs control to cause the face region extraction processing unit 14, the image feature amount calculation unit 15, the correction effect inference processing unit 16 and the image correction processing unit 17 to perform the image data correction process. On the contrary, when it is discriminated by the photographing mode discrimination processing unit 18 that the photographing mode included in the photographing information is not the person mode, the correction process control unit 19 performs control to cause the face region extraction processing unit 14, the image feature amount calculation unit 15, the correction effect inference processing unit 16 and the image correction processing unit 17 not to perform the image data correction process.

Symbol 1A denotes a face region correction processing unit (face region correction means). Before the correction effect inference processing unit 16 infers the effect of the correction, the face region correction processing unit 1A corrects a characteristic of the face region and outputs post-correction face region data by using the image feature amount of the face region. At that time, the image feature amount calculation unit 15 calculates an image feature amount of the post-correction face region from the post-correction face region data output by the face region correction processing unit 1A.

The correction effect inference processing unit 16 infers whether or not the correction effect can be obtained and thus outputs an inference result (second inference result), by comparing the image feature amount before the correction with the post-correction image feature amount after the correction both calculated from the same face region by the image feature amount calculation unit 15. Incidentally, the face region correction processing unit 1A performs the process only to the face region of the image data which has been inferred as the first inference result (the size of the area of the face region) by the correction effect inference processing unit 16 that the correction effect can be obtained.

Symbol 1B denotes an expansion processing unit. When the image data compressed in the JPEG format or the like is obtained by the image obtaining processing unit 13, the expansion processing unit 1B expands the compression image data according to a predetermined algorithm corresponding to the above compression method into image data of two-dimensional pixel arrangement composed of the R, G and B data. Numeral 20 denotes a display processing unit which performs a process to display the image on the display apparatus 4, and numeral 21 denotes a print processing unit which performs a process to print the image by the printer 5. By the above structure, the image processing apparatus 2 can perform the image correction process only when it is inferred that the correction effect can be obtained.

Figure 3A:
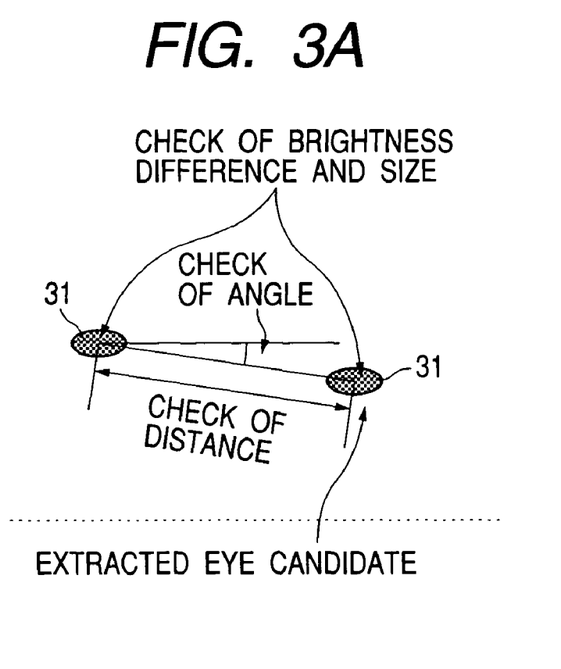
FIGS. 3A, 3B and 3C are diagrams showing a concrete example of the process by a face region extraction processing unit 14 shown in FIG. 1.
Figure 3B:
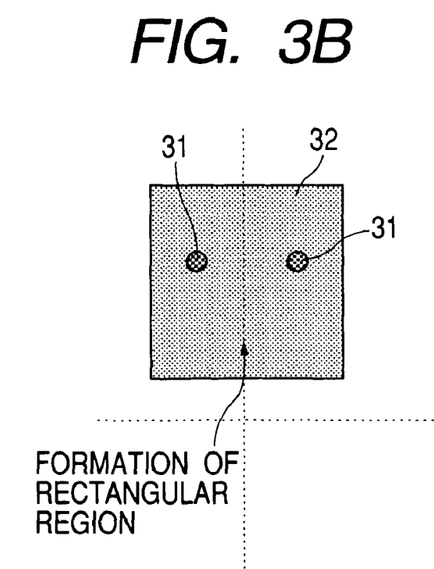
Figure 3C:
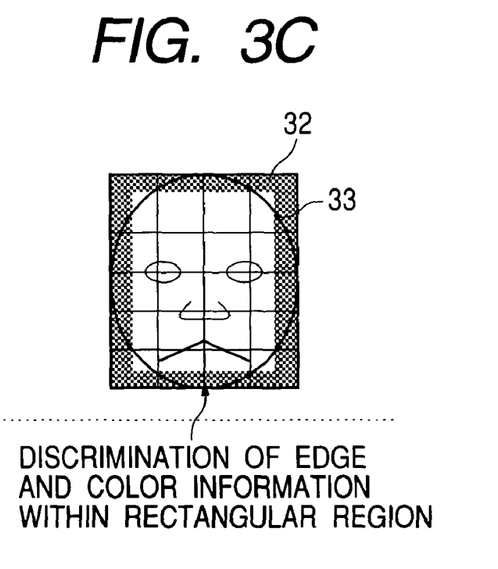

Next, a concrete example of the process by the face region extraction processing unit 14 will be explained with reference to the drawings. FIGS. 3A, 3B and 3C are diagrams showing the concrete example of the process by the face region extraction processing unit 14 shown in FIG. 1. That is, first, the face region is extracted from the image data. Then, the face region extraction processing unit 14 performs a low-pass filter process to the extracted image data and simultaneously reduces the image (face region) to a predetermined image size. For example, when image data photographed by the digital camera and obtained from the recording medium 3 by the image obtaining processing unit 13 is the data of 1280×960 pixels, the face region extraction processing unit 14 performs an average value process (low-pass filter process) of 2×2 to the image data, whereby it is reduced to the data of 640×480 pixels.

Then, from the pixel values of the reduced image data, the face region extraction processing unit 14 extracts a small region that R, G and B components are locally small, as a candidate of an eye image region (hereinafter called eye candidate). More specifically, as shown in FIG. 3A, the face region extraction processing unit 14 sets the two extracted eye candidates as a pair of eye candidates, and checks uniformity of the pair of eye candidates, a brightness difference between the eye candidates in this pair, an angle of the line obtained between the eye candidates of this pair from a horizontal line, and the like. Thus, the face region extraction processing unit 14 discriminates whether or not the checked pair of eye candidates actually indicates the eyes of the person. Then, if it is discriminated by the face region extraction processing unit 14 that the extracted pair of eye candidates indicates the eyes, a pair of eye candidates 31 is finally extracted.

Moreover, as shown in FIG. 3B, the face region extraction processing unit 14 sets a rectangular region 32 on the basis of parameters of predetermined position relation previously set according to the two positions of the pair of eye candidates 31. Next, as shown in FIG. 3C, the face region extraction processing unit 14 determines a face region 33 based on the edge in the vicinity of the boundary of the rectangular region 32 and color information within the rectangular region 32. At that time, in regard to the edge, the face region extraction processing unit 14 discriminates whether or not an edge component exceeding predetermined intensity occupies the region of a predetermined width in the vicinity of the boundary of the rectangular region 32 by a predetermined ratio or more. Moreover, in regard to the color information, the face region extraction processing unit 14 calculates an average value of the pixel values within the rectangular region 32, and then discriminates whether or not the calculated average value is within a previously set flesh color region. If both the condition of the edge and the condition of the color information are satisfied, the face region extraction processing unit 14 extracts the region in question as the face region 33. By using the above process, the face region extraction processing unit 14 extracts one or plural face regions 33 from one image data.

Each of the processing units shown in FIG. 1 may be achieved by dedicated hardware. Moreover, each unit may be structured by a memory and a CPU so that the function of the unit is achieved by reading a program for achieving the function of each unit into the memory and then executing the read program by the CPU. Besides, the above program may be a part of an application program for the entire image process. Here, it is assumed that the above memory is made by a nonvolatile memory such as a hard disk, a magnetooptical disk, a flash memory or the like, a recording medium such as a CR-ROM or the like from which only reading is possible, a volatile memory such as the RAM 216 or the like, or a computer-readable/writable recording medium by the combination of these memories and recording media.

Next, the operations of the image processing apparatus 2 and the image processing system 1 will be explained by way of example.

Figure 4:
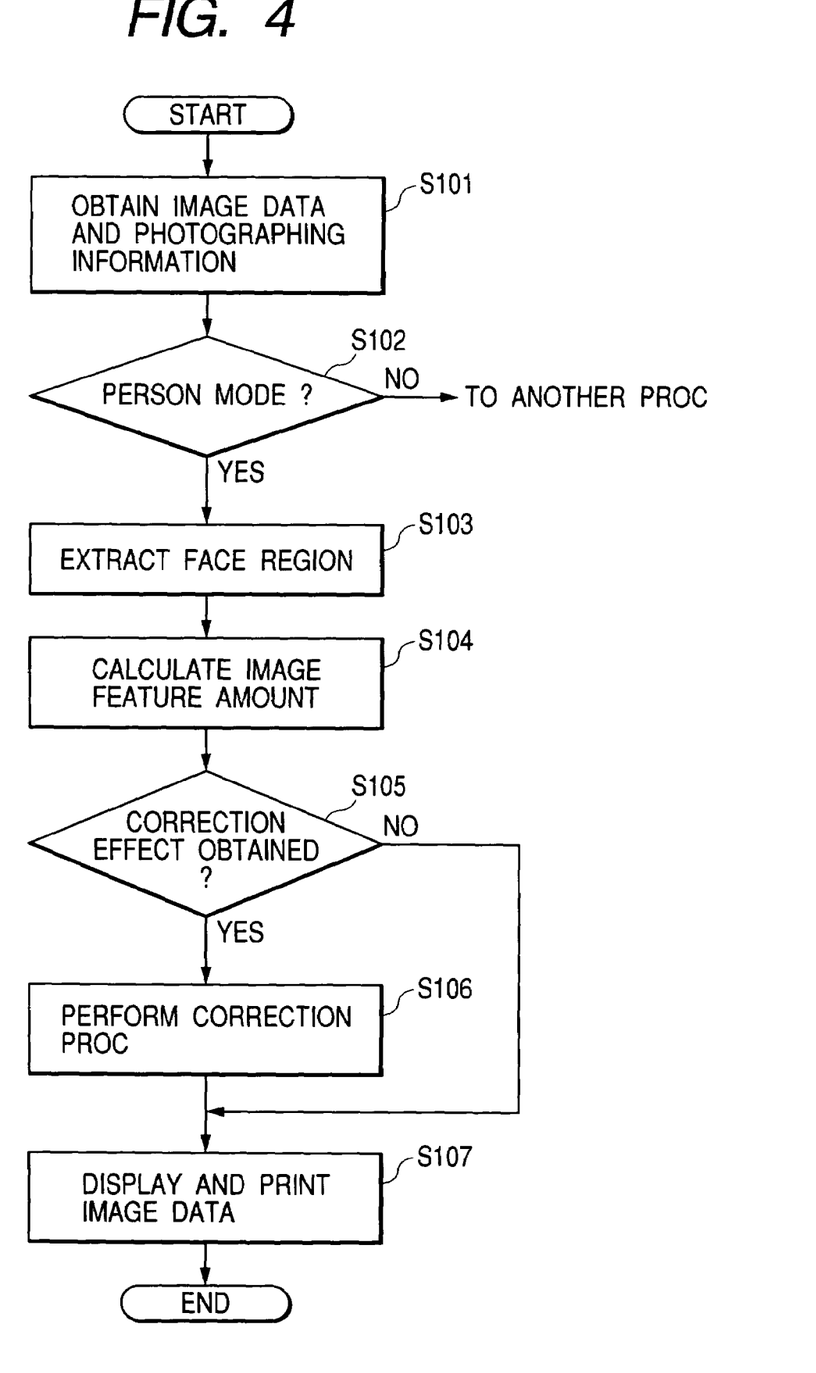
FIG. 4 is a flow chart showing the operations of the image processing apparatus 2 and the image processing system 1 both shown in FIG. 1.

FIG. 4 is a flow chart showing the operations of the image processing apparatus 2 and the image processing system 1 both shown in FIG. 1. In FIG. 4, it is assumed that the recording medium 3 in which the image data photographed and obtained in the person mode has been stored is mounted on the recording medium I/F unit 11 before the operation starts. Moreover, it is assumed that a file list of the image data stored in the recording medium 3 is displayed on the display apparatus 4 so that a user can arbitrarily designate an appropriate file.

Incidentally, when the user designates the appropriate file of the image data stored in the recording medium 3 by a mouse click or the like, the image obtaining processing unit 13 obtains the image data together with the photographing information being the information concerning a photographing condition (step S101). Thus, the image data and the photographing information are stored in the image information database 12 of the image processing apparatus 2. At that time, the expansion processing unit 1B expands the image data according to the predetermined algorithm corresponding to the JPEG method into the image data of the two-dimensional pixel arrangement of the R, G and B values.

Then, the photographing mode discrimination processing unit 18 discriminates whether or not the image data was photographed and obtained in the person mode, by referring to the photographing mode included in the photographing information incidental to the expanded image data (step S102). Here, when it is discriminated that the image data was obtained in the person mode (i.e., YES in the step S102), the flow advances to a next step S103 under the control of the correction process control unit 19. On the contrary, when it is discriminated that the image data was photographed in a mode other than the person mode (i.e., NO in the step S102), the process in a step S103 and the subsequent processes are not performed. That is, another process is not performed under the control of the correction process control unit 19 in this case. Incidentally, although the image processing apparatus according to the present embodiment discriminates the person-included image with reference to the information concerning the photographing mode, the present invention is not limited to this. That is, it is preferably possible to use various methods of discriminating that a person (particularly a face portion of the person) is included in the image data.

The face region extraction processing unit 14 extracts the face region 33 as shown in FIG. 3C from the image data obtained and expanded by the image obtaining processing unit 13 (step S103). Then, the image feature amount calculation unit 15 calculates the image feature amount being the feature amount of the image within the face region 33 extracted by the face region extraction processing unit 14 (step S104). More specifically, the image feature amount calculation unit 15 discriminates whether or not each pixel value within the extracted face region 33 belongs to a predetermined flesh color region, and calculates a statistics value indicating the lightness distribution of the pixels of the flesh color region. At that time, the lightness calculated by the image feature amount calculation unit 15 is obtained by, for example, calculating the average value of the R, G and B values of each pixel. Moreover, as the above statistics value, for example, the image feature amount calculation unit 15 calculates histograms, average values and distribution values of the lightness, hue and the like in regard to each pixel of the face region 33, and calculates the total number of pixels included in the face region 33. Incidentally, the calculation of the image feature amount of the face region 33 by the image feature amount calculation unit 15 is performed to the entire face region 33 extracted by the face region extraction processing unit 14.

Next, the correction effect inference processing unit 16 infers whether or not the correction effect can be obtained from the image feature amount calculated by the image feature amount calculation unit 15 (step S105). More specifically, the correction effect inference processing unit 16 infers the correction effect in accordance with the area (i.e., the total number of pixels) of the face region 33 calculated by the image feature amount calculation unit 15 (first inference). The basis of the above inference will be explained as follows.

The image correction processing unit 17 performs the image correction so that the face region 33 extracted from the image comes to have optimum lightness. At that time, for example, when the face of the person in the image is small, to correct the extracted face region 33 so as to have the optimum lightness does not necessarily brings about a desirable image. Moreover, when the face region 33 is small, the image feature amount calculated by the image feature amount calculation unit 15 is easily influenced by noises in the image, whereby there is a fear that the image feature amount becomes an inaccurate value. As a result, when the image correction processing unit 17 performs the correction process based on such an inaccurate image feature amount, there is a fear that a side effect due to the image correction occurs. Therefore, when the area of the face region 33 is smaller than a predetermined threshold value, it is inferred that the correction effect of the image cannot be expected.

Here, it should be noted that the predetermined threshold value of the area of the face region 33 is previously obtained by checking the correlation between an effect (or no effect) of the correction process and the area in various kinds of image data.

Next, the face region correction processing unit 1A performs the correction process to the face region 33 of the image data that the correction effect inference processing unit 16 has inferred the effect of the correction based on the area of the face region 33, and then the face region correction processing unit 1A outputs the post-correction face region data. The image feature amount calculation unit 15 calculates the post-correction image feature amount (including a lightness histogram) being the image feature amount of the post-correction face region data output by the face region correction processing unit 1A. Then, the correction effect inference processing unit 16 infers whether or not the correction effect can be obtained (second inference), by comparing the pre-correction lightness histogram and the post-correction lightness histogram both calculated from the same face region by the image feature amount calculation unit 15. The basis of the above inference will be explained as follows.

For example, when the person being the subject is wearing a hat or a cap, there is a shadow on a part of the face, and it is thus difficult to automatically correct the lightness of the face region, whereby it is impossible to satisfactorily express a gradation of the skin part of the person. In such a case, if the image correction is performed, the shape of the lightness histogram in the face region highly changes. Therefore, the face region correction processing unit 1A previously performs the conversion of the pixel value in the image correction process performed by using the image feature amount of the face region, and the correction effect inference processing unit 16 compares the lightness histograms before and after the process and infers the processing effect according to whether or not the histogram shape changes by a predetermined amount or more.

Incidentally, when there are plural face regions, the image processing apparatus 2 infers the correction effect (second inference) only in regard to the face region (large face region) which has been inferred that the correction effect can be obtained (first inference). Then, in the second inference, when there is the region that the correction effect cannot be expected or obtained, it is inferred that the correction effect cannot be obtained in the entire image, because there is a fear that a side effect occurs. That is, it is controlled not to perform the correction because there is the fear that the side effect may occur in the large face region.

The image correction processing unit 17 obtains the parameters necessary in the lightness correction from the image feature amount of the face region, and then actually performs the image correction process (step S106). At that time, as the parameters for the lightness correction, the parameters same as those used in the correction by the face region correction processing unit 1A when it is inferred in the step S105 that the correction effect can be obtained are used. More specifically, the process of the image correction processing unit 17 to obtain the parameters for the lightness correction by using the image feature amount and then perform the image correction will be explained hereinafter.

First, in advance, a range of lightness of the flesh color that human beings feel desirable is checked in regard to each of various face images, and its center value and distribution value are parameterized as a target value of the lightness and stored in the image correction processing unit 17. For example, when it is assumed that the pixel value before the conversion is v, the pixel value after the conversion is v', an average value of flesh-color pixels in the face region is ì, a standard deviation (square root of the distribution value) is ó, the center value of the target value of the lightness is i', and a standard deviation thereof is ó', the image correction processing unit 17 obtains the pixel value v' according to an equation (1).

$$v'=k\times v+i'-i,\ k=ó'/ó \qquad (1)$$

In this case, it is assumed that, when the pixel value v' exceeds=a predetermined range, the obtained pixel value v' is limited to the upper and lower limits of the predetermined range.

The calculation according to the equation (1) is performed respectively to the R, G and B values of the pixels in the entire image. Incidentally, when there are the plural face regions, the parameters are obtained by using the average value of the image feature amounts in the respective face regions (large face regions) which have been inferred, based on, e.g., the areas, that the correction effect can be obtained.

The image data which has been subjected to the correction process by the image correction processing unit 17 is displayed on the display apparatus 4 under the control of the display processing unit 20, whereby the user can confirm the contents of the image data. After then, the displayed and confirmed image data is printed by the printer 5 (step S107).

As explained above, the image processing apparatus 2 can perform the correction process only when it is inferred that the image correction is effective.

Moreover, when the image data indicating the person image is corrected, it is possible to output the person image of the optimum characteristics by previously eliminating the side effects due to the correction process. Thus, the correction effect is previously inferred, and the image data is corrected only in the case where it has been inferred that the correction effect can be obtained, whereby it is possible to automatically correct the person image data and output the person image of the optimum lightness and color reproducibility.

Next, another example of the operations of the image processing apparatus 2 and the image processing system 1 will be explained. Hereinafter, as a matter of convenience, it is assumed that the above example is called a process example 1 and this example is called a process example 2. In the process example 2, when the image correction process is performed, a process of correcting the face region of the person to generate the image of an appropriate flesh color that human beings feel desirable is performed. Here, the image processing apparatus 2 in the process example 2 has the same functional structure as that of the image processing apparatus 2 shown in FIG. 1. Moreover, the process in the process example 2 is basically performed according to the operation flow shown in FIG. 4, but the concrete processes corresponding to the steps S104 to S106 are different from those in the process example 1. Therefore, only these processes will be explained, and the explanation of other processes common to the process example 1 will be omitted.

In the step S104, the image feature amount calculation unit 15 calculates the image feature amount from each pixel value within the face region 33 extracted by the face region extraction processing unit 14, according to the following processes. That is, first, the image feature amount calculation unit 15 discriminates whether or not each pixel value within the extracted face region 33 belongs to the predetermined flesh color region. Next, the image feature amount calculation unit 15 calculates the statistics value indicating the lightness distribution of the pixels which have been judged to belong to the flesh color region.

For example, the image feature amount calculation unit 15 calculates a hue h according to an equation (2).

$$h=\tan^{-1}[3\times(g-b)/\{(r-g)+(r-b)\}] \qquad (2)$$

In this case, it is assumed that the symbols r, g and b respectively denote the R, G and B values of each pixel, and a possible range of the hue h is [0, 2ð]. Moreover, as the statistics value, for example, the image feature amount calculation unit 15 calculates the lightness and hue histograms in regard to each pixel, the average value, the distribution value, and the total number of pixels included in the face region 33. Incidentally, the above calculation of the image feature amount of the face region 33 by the image feature amount calculation unit 15 is performed to the entire face region 33 extracted by the face region extraction processing unit 14 in the step S103 of FIG. 4 (the above process is the process corresponding to the step S104 of the process example 1).

The correction effect inference processing unit 16 infers whether or not the correction effect can be obtained from the image feature amount calculated by the image feature amount calculation unit 15. First, the correction effect inference processing unit 16 infers the correction effect from the area (the total number of pixels) of the face region 33 calculated by the image feature amount calculation unit 15. This process is the same as that in the process example 1. Next, the face region correction processing unit 1A performs the correction process to the face region 33 of the image data that the correction effect inference processing unit 16 has inferred the effect of the correction based on the area of the face region 33, and then the face region correction processing unit 1A outputs the post-correction face region data.

The image feature amount calculation unit 15 calculates the post-correction image feature amount (including the hue histogram) being the image feature amount of the post-correction face region data output by the face region correction processing unit 1A. Then, the correction effect inference processing unit 16 infers whether or not the correction effect can be obtained, by comparing the pre-correction hue histogram and the post-correction hue histogram both calculated from the same face region 33 by the image feature amount calculation unit 15. Incidentally, when there are the plural face regions 33, the correction effect is inferred only in regard to the face region 33 (large face region) which has been inferred that the correction effect can be obtained based on the inference of the area. Then, when there is the face region 33 that the correction effect cannot be expected or obtained, it is inferred that the correction effect cannot be obtained in the entire image, because there is a fear that the side effect occurs (the above process is the process corresponding to the step S105 of the process example 1).

Next, the image correction processing unit 17 obtains the parameters for the color correction from the image feature amount of the face region 33, and then actually performs the following image correction process. At that time, as the parameters for the color correction, the parameters same as those used in the correction by the face region correction processing unit 1A when it is inferred that the correction effect can be obtained are used. More specifically, in advance, a range of hue of the flesh color that human beings feel desirable is checked in regard to each of various face images, and its center value and distribution value are parameterized as a target value of the hue and stored in the image correction processing unit 17.

For example, when it is assumed that hue of the pixel before the correction is h, hue thereof after the correction is h', average hue of the flesh color in the face region 33 is $ì_h$, a standard deviation (square root of the distribution value) is $ó_h$, the center value of the target value of the hue is $ì_h'$, and a standard deviation thereof is $ó_h'$, the image correction processing unit 17 obtains the hue h' according to an equation (3).

$$h' = k_h \times h + i_h' - i_h, \quad k_h = ó_h'/ó_h \quad (3)$$

In this case, when the hue h' exceeds the range [0, 2δ], the phase of the hue h' is shifted by 360° so that the hue h' is set in this range.

Next, the image correction processing unit 17 obtains the R, G and B component values in regard to each pixel so that the lightness and saturation values before the correction are maintained and the hue component is set to have the value after the calculation of the equation (3). Such a process is performed to the entire image. Incidentally, when there are the plural face regions 33, the parameters are obtained by using the average value of the image feature amounts in the respective face regions 33 (large face regions) which have been inferred, based on, e.g., the areas, that the correction effect can be obtained (the above process is the process corresponding to the step S106 of the process example 1)

As described above, according to the present embodiment, before the image correction is actually performed, the image processing apparatus 2 infers based on the area of the face region whether or not the correction effect can be obtained. Then, only when it is inferred that the correction effect can be expected (obtained), the image processing apparatus actually performs the image correction. Therefore, the image processing apparatus 2 can avoid performing the correction process in such a case where the correction effect cannot be expected because the face region is relatively small. Moreover, the image processing apparatus 2 can avoid performing the correction process also in a case where the correction process tends to be easily influenced by noises caused when the image is obtained.

Besides, before the image correction process, the image processing apparatus 2 confirms how the histogram of the face region changes due to the image correction and then infers based on the confirmed result whether or not the correction effect can be obtained. Therefore, the image processing apparatus 2 can avoid the side effect that the gradation of the face region cannot satisfactorily be expressed by the image correction. Moreover, the image processing apparatus 2 operates only in a case where the photographing mode information incidental to the image data indicates the person mode, whereby it is possible to avoid erroneously applying the correction process to a landscape image or the like.

Although the correction process is performed by converting the entire image based on the equation (1) or (3) in the present embodiment, the present invention is not limited to this. That is, for example, the correction process may be performed only in the face region 33 extracted in the step S103. Moreover, in regard to the region other than the face region 33, the image processing apparatus 2 may perform the correction process of a small extent as compared with the correction process to the face region 33. Besides, when the plural face regions 33 are extracted, the image processing apparatus 2 may obtain the parameter in each face region 33 and thus perform the image correction process to each face region 33 based on the corresponding parameter.

Although the above image processing system 1 consists of the image processing apparatus 2, the display apparatus 4 and the printer 5, the present invention is not limited to this. That is, the image processing apparatus 2 may include the display apparatus 4, or the printer 5 may be omitted. Besides, although the image processing apparatus 2 handles the image data photographed by the digital camera, the present invention is not limited to this. That is, when the image processing apparatus 2 has a function to connect with a network such as Internet or the like, it may use image data obtained through the network as the image data. In addition, the image processing apparatus 2 may use, as the image data, data obtained as still image data of one frame from moving image data taken by a video camera. Incidentally, the printer 5 may be equipped with a processing unit to achieve the function of the image processing apparatus 2.

Moreover, in a case where the program to achieve the functions of the processing units shown in FIG. 1 is recorded on a computer-readable recording medium, the processing units may be operated by reading the program from the recording medium, and writing the read program into a computer system so as to operate the processing units. Here, it should be noted that the computer system includes an operation system (OS) and hardware such as peripheral devices and the like. Besides, the computer system includes a homepage providing environment (or homepage displaying environment) in a case where a WWW (World Wide Web) system is used.

Moreover, it should be noted that the computer-readable recording medium includes a portable medium such as a flexible disk, a magnetooptical disk, a ROM, a CD-ROM or the like, and a storage such as a hard disk or the like built in the computer system. Besides, the computer-readable recording medium includes a medium, holding the program for a certain time, such as a volatile memory (e.g., RAM) in the computer system acting as a server or a client when the program is transmitted through the network such as the Internet or a communication line such as a telephone line.

Moreover, the program may be transmitted from the computer system, in which the program has been stored in the storage or the like, to another computer system through a transmission medium or a transmission wave in the transmission medium. Here, it should be noted that the transmission medium for transmitting the program is the medium such as the communication network (e.g., the Internet) or the communication line (e.g., the telephone line) which has a function to transmit information. Besides, the program may be a type of achieving a part of the above function. In addition, the program may be so-called a difference file (difference program) which can achieve the above function by the combination with the program already recorded in the computer system.

Moreover, a program product such as a computer-readable recording medium on which the above program has been recorded is applicable as the embodiment of the present invention. Here, it should be noted that the above media such as the program, the recording medium, the transmission medium and the program product are all included in the scope of the present invention.

As above, the embodiment of the present invention has been explained in detail with reference to the attached drawing. However, the concrete structure of the present invention is not limited to the above embodiment but is also applicable to other embodiments. That is, many apparently and widely different embodiments of the present invention can be made without departing from the spirit and scope thereof, and it is to be understood that the present invention is not limited to the specific embodiments thereof expect as defined in the appended claims.

What is claimed is:

1. An image processing apparatus which performs a correction based on a feature amount of image data of a face region, the image processing apparatus comprising:
   a face region extraction unit, adapted to extract the face region of a person from input image data;
   a judgment unit, adapted to judge whether or not an area of the face region is larger than a predetermined value;
   a determination unit, adapted to determine, in a case where it is judged by the judgment unit that the area of the face region is larger than the predetermined value, whether or not to perform the correction to the input image data based on a first feature amount of the input image data of the face region and a second feature amount of corrected image data of the face region; and
   an image correction unit, adapted to perform the correction of the input image data in a case where it is determined by the determination unit to perform the correction to the input image data,
   wherein the image correction unit does not perform the correction to the input image data in a case where it is judged by the judgment unit that the area of the face region is smaller than the predetermined value, and in a case where it is determined by the determination unit not to perform the correction to the input image data.

2. An image processing apparatus according to claim 1, further comprising a discrimination unit, adapted to discriminate whether or not a photographing mode corresponding to the input image data is a person mode,
   wherein the image correction unit does not perform the correction to the input image data in a case where it is discriminated by the discrimination unit that the photographing mode corresponding to the input image data is the person mode.

3. An image processing apparatus according to claim 1, wherein the first image feature amount and the second image feature amount are statistics.

4. An image processing apparatus according to claim 3, wherein the statistics are based on a lightness histogram.

5. An image processing method which performs a correction based on a feature amount of image data of a face region, the method comprising:
   extracting a face region of a person from input image data;
   judging whether or not an area of the face region is larger than a predetermined value;
   determining, in a case where it is judged in the judging step that the area of the face region is larger than the predetermined value, whether or not to perform the correction to the input image data based on a first feature amount of the input image data of the face region and a second feature amount of corrected image data of the face region; and
   correcting the input image data in a case where it is determined in said determining step to perform the correction to the input image data,
   wherein said correcting step does not perform the correction to the input image data in a case where it is judged in said judging step that the area of the face region is smaller than the predetermined value and in the case where it is determined in said determining step not to perform the correction to the input image data.

6. A computer-readable recording medium containing a program for causing a computer to execute a process to perform a correction based on a feature amount of image data of a face region, the process comprising:
   extracting a face region of a person from input image data;
   judging whether or not an area of the face region is larger than a predetermined value;
   determining, in a case where it is judged in said judging step that the area of the face region is larger than the predetermined value, whether or not to perform the correction to the input image data based on a first feature amount of the input image data of the face region and a second feature amount of corrected image data of the face region; and
   correcting the input image data in a case where it is determined in said determining step to perform the correction to the input image data,
   wherein said correcting step does not perform the correction to the input image data in a case where it is judged in said judging step that the area of the face region is smaller than the predetermined value and in a case where it is determined in said determining step not to perform the correction to the input image data.

* * * * *

UNITED STATES PATENT AND TRADEMARK OFFICE
CERTIFICATE OF CORRECTION

PATENT NO.       : 7,358,994 B2
APPLICATION NO.  : 10/619438
DATED            : April 15, 2008
INVENTOR(S)      : Kotaro Yano Page 1 of 1

It is certified that error appears in the above-identified patent and that said Letters Patent is hereby corrected as shown below:

Col. 8,  line 28,   "brings" should read --bring--.

Col. 9,  line 44,   "í," should read --ì--.

Col. 11, line 67,   "1)" should read --1).--.

Col. 14, line 9,    "not" should be deleted.

Signed and Sealed this

Twenty-eighth Day of October, 2008

JON W. DUDAS
*Director of the United States Patent and Trademark Office*